US008225708B2

(12) United States Patent
Lassota et al.

(10) Patent No.: US 8,225,708 B2
(45) Date of Patent: Jul. 24, 2012

(54) MULTI-BEVERAGE BREWER WITH ON-DEMAND VARIABLE BREW WATER TEMPERATURE AND METHOD

(75) Inventors: Michael W. Lassota, Wauconda, IL (US); Zbigniew G. Lassota, Long Grove, IL (US)

(73) Assignee: Food Equipment Technologies Company Inc., Lake Zurich, IL (US)

( * ) Notice: Subject to any disclaimer, the term of this patent is extended or adjusted under 35 U.S.C. 154(b) by 913 days.

(21) Appl. No.: 12/248,194

(22) Filed: Oct. 9, 2008

(65) Prior Publication Data

US 2009/0255408 A1 Oct. 15, 2009

Related U.S. Application Data (60) Provisional application No. 60/998,840, filed on Oct. 12, 2007.

(51) Int. Cl.
*A47J 31/40* (2006.01)
*H05B 3/02* (2006.01)

(52) U.S. Cl. ........... 99/282; 99/281; 99/285; 99/305; 99/291; 99/299; 99/280; 99/288; 392/441; 219/480; 219/477; 219/483; 219/486; 219/487; 219/508

(58) Field of Classification Search .............. 99/281, 99/285, 305, 291, 299, 280, 282, 288, 271; 392/414; 219/480, 477, 483, 486–7, 508
See application file for complete search history.

(56) References Cited

U.S. PATENT DOCUMENTS

6,453,798 B2 * 9/2002 Clean et al. ............. 99/280
* cited by examiner

*Primary Examiner* — Shawntina Fuqua
(74) *Attorney, Agent, or Firm* — James W. Potthast; Potthast & Associates

(57) ABSTRACT

A beverage brewer (10) with a temperature selectable dispense system having an on-demand hot water heating chamber assembly (30) with a hot water chamber body (86) having a volume substantially less than the volume of beverage brewed during a single brew cycle, a heating element (98) to quickly and substantially alter the water temperature in the chamber body during a single brew cycle and a microprocessor controller (38) for controlling the heating element in response to temperature sensors (40, 42). The controller (38) controls the brewer (10) to brew different types of beverages, with dispense water at different preselected temperatures in response to a manually actuatable switch (72, 74, 76 and 78). The temperature of the dispense water may also be changed from a hotter temperature at the beginning of a brew cycle to a lower temperature during an end portion of the same brew cycle.

23 Claims, 6 Drawing Sheets

| CODE NO. | BEVERAGE NAME | PROFILE CODE | START TEMP | END TEMP | SWITCH NO. |
|---|---|---|---|---|---|
| 1 | TEA GREEN | TG2 | 165° | 165° | 2 |
| 2 | TEA BLACK | TB6 | 160° | 160° | M |
| 3 | COFFEE BLEND 1 | CP1 | 205° | 185° | 1 |
| N | COFFEE KONA | CK3 | 210° | 190° | 3 |

MULTI-BEVERAGE BREWER WITH ON-DEMAND VARIABLE BREW WATER TEMPERATURE AND METHOD

CROSS-REFERENCE TO RELATED APPLICATIONS

This application claims the benefit under 355 U.S.C. 119 (e) of provisional patent application No. 60/998,840 of the present inventors filed Oct. 12, 2007, and entitled Multi-beverage Brewer with On-demand Variable Brew Water Temperature and Method.

BACKGROUND OF THE INVENTION

1. Field of the Invention

This invention generally relates to electrical hot beverage brewers, such as electrical hot coffee brewers or hot tea brewers, and more particularly to such brewers in which hot water is passed through an ingredient within a brew basket to make a freshly brewed beverage.

2. Description of the Prior Art

Commercial sized hot beverage brewers of the type that pass hot water through a beverage ingredient such as ground coffee, instant coffee, tea leaves, instant tea, cocoa, etc. are well know. Examples are shown in U.S. Pat. Nos. issued to Zbigniew G. Lassota, 5,000,082 issued Mar. 19, 1991; 5,331,885 issued Jul. 26, 1994; 5,943,944 issued Aug. 31, 1999; 6,148,717 is issued Nov. 21, 2000; 6,571,685 issued Jun. 3, 2003; 6,845,704 issued Jul. 22, 2003; and 6,829,901 issued Dec. 14, 2004, and reference should be made to these patents with respect to any details concerning brewers of this type, all of which are hereby incorporated by reference.

In these brewers, the hot water is kept at a preselected temperature within a hot water chamber that is substantially larger than the quantity of beverage to be made during a single brew cycle, such a 0.5-2.5 gallons. Such hot water chambers may have a capacity of twenty gallons or more. One reason that the hot water chamber is so much larger than the batch size of beverage to be made during each brew cycle is to reduce the amount of temperature reduction that is caused when fresh cold water is introduced to the hot water chamber during a brew cycle. During a brew cycle, the amount of hot water that is taken from the hot water chamber to be passed to the brew basket is automatically replenished with cold water from a pressurized cold water source such as from a public water utility. By maximizing the ratio of the total quantity of hot water in the chamber to the batch amount of cold water that is introduced to the chamber during any one brew cycle, the recovery time of the hot water chamber required to reheat all the water to the desired preselected temperature before the next brew cycle can begin is minimized. The hot water chamber system is intentionally designed to have a large thermal inertia. Because of the large quantity of water that is maintained at the preselected temperature, the temperature cannot be quickly lower or raised.

Consequently, such brewers are generally set up to operate at only one single temperature that is generally selected to be the optimum temperature for brewing the particular beverage that is to be brewed. If the brewer is intended to be used as a tea brewer, then the set point for the hot water chamber temperature is fixed at the optimum temperature for tea, such as 160-degrees Fahrenheit. On the other hand, if the brewer is intended to be used to brew coffee, then the hot water chamber water temperature is selected to be the optimum brewing temperature for the particular type of coffee being brewed, such as 205-210-degrees Fahrenheit. Thus, during installation of a commercial brewer, the technician-installer programs the microprocessor based brewer controller to operate one or more heating elements within the hot water chamber to maintain the hot water at one and only one preselected optimum temperature for the intended type of beverage that is going to be brewed. This temperature remains fixed and generally the user or operator does not have access to the program for changing the set temperature.

If it is desired to change the setup of the brewer from coffee to tea or vice versa, then the trained technician-installer must make the change. In any event, there are no operator accessible controls to change the automatically maintained set temperature. If a change is made, then it may take several minutes or longer, depending upon the magnitude of the change, before the actual temperature of the hot water in the chamber is at the set temperature. Until then, the brewer is often disabled from performing another brew cycle. While the rate of change can be increased by increasing the size of the heating elements, as a practical matter, because of the large thermal inertia of the hot water chamber system, heaters large enough to rapidly change the temperature would draw more amperage than would normally be permitted by the AC power supplies of typical commercial users. Also, when it is desired to lower the temperature, the rate of lowering is dictated by ambient temperature and the heat loss characteristics of the hot water chamber which cannot be changed.

The large size of hot water chambers in known commercial brewers is not simply a matter of design choice but is required for successful operation. Successful operation in known single ingredient brewers requires the temperature to remain fixed and the quantity of hot water in the chamber to remain relatively stable. Generally, the hot water chamber in known brewers is intentionally designed to hold a quantity of hot water that is several times the quantity used during a single brew cycle to provide the chamber with a high level of thermal inertia. The high thermal inertia is needed so that the addition of cold water to the hot water chamber does not drastically lower the temperature of the hot water being drawn from the chamber during a brew cycle as cold water is added to the bottom of the chamber as hot water is drained off of the top of chamber. In known brewers, where quantity of dispense water is determined by measuring the length of elapsed time that a dispense valve is opened, a large hot water chamber is necessary to maintain a relatively fixed level so that the dispense rate remains relatively fixed despite the removal of hot water from the chamber during a brew cycle.

Because the circumstances relating to the size of the hot water chamber in commercial brewers, it is believed unknown in commercial brewers to selectively brew different types of beverage ingredients that have different optimum brewing temperatures by changing the brewing water temperature between successive brew cycles during normal operations. That is if it is desired to provide freshly brewed tea and freshly brewed coffee, two separate brewers must be used and the cost of space, operations, maintenance, etc. of two brewers must be absorbed.

SUMMARY OF THE INVENTION

It is therefore an object of the present invention to provide a brewer and method of brewing in which the brewing at optimum temperatures of batches of different types of beverage ingredients may be performed promptly, selectively and alternatively during normal commercial coffee making operations through means of routine user controls.

This object is achieved by providing a temperature selectable dispense system in a beverage brewer having a brew basket assembly for holding ingredient to be brewed and a dispense spray head for passing water onto a top surface of a layer of ingredient supported within the brew basket assembly during a dispense period of a brew cycle, including an on-demand hot water heating chamber having a hot water chamber for holding water to be heated, an inlet to the chamber connectable with a source of unheated water, an outlet of the chamber connected with the dispense head, means for heating water within the chamber, and means for sensing the temperature of the water within the chamber; means for selecting at least two different temperatures of water being passed from the outlet to the dispense head; and a microprocessor controller responsive to the selecting means and to the temperature sensor to control the heating means as needed to maintain water being passed from the outlet at a selected one of the at least two different temperatures during a selected portion of the course of a brew cycle.

Preferably, during each brew cycle, a preselected quantity of water is passed to the brew basket to brew a batch of freshly brewed beverage of a preselected volume, the volume of the hollow chamber is substantially less than the preselected batch volume. The ratio of the hot water chamber volume to the batch volume is approximately 0.6 and the batch volume is approximately 0.5 gallons. In the preferred embodiment, the hollow body of the hot water chamber has a central axis of symmetry, and the heating means is an elongate electrical heating element extending along the central axis of symmetry. The hollow body of the hot water chamber has an inlet end that is sealed closed except for the inlet and an outlet end that is sealed closed except for the outlet, and the heating means is an electrical heating element with a pair of electrical connectors that are respectively mounted to the opposite ends and accessible for electrical contact from without the hollow body.

The beverage brewer preferably has a pair of manually actuatable switches respectively associated with at least two different temperatures, and the controller has means for selectively controlling the brewer to brew two different types of beverages respectively requiring dispense water at the at least two different temperatures in response to the manually actuatable switches.

Preferably, the microprocessor controller is programmed to automatically return the temperature of the water within the hot water chamber to a lowest one of the at least two temperatures by at least no later than the completion of a brew cycle in which the water had been maintained at a higher one of the at least two temperatures.

The objective is also achieved in part by providing a multi-beverage adjustable beverage brewer for brewing different types of beverages having a brew basket assembly for selectively holding different beverage ingredients; a manual selection switch for selectively starting different brew cycles associated with different beverage ingredients, a dispense system for dispensing hot water onto the ingredient within the brew basket assembly, and a controller programmed to control the dispense system to dispense the hot water during a brew cycle at different optimal temperatures associated with the different beverage ingredients in response to the a manual selection device.

Included, is a heating chamber through which an amount of the hot water is passed to the brew basket assembly during a dispense period of a brew cycle that is substantially more than the maximum quantity that can be held by the heating chamber.

BRIEF DESCRIPTION OF THE DRAWINGS

The foregoing objects, features and advantages will be described in detail and other objects, features and advantages will be made apparent from the Detailed Description given with reference to the several figures of the drawings, in which.

DETAILED DESCRIPTION

Figure 1:
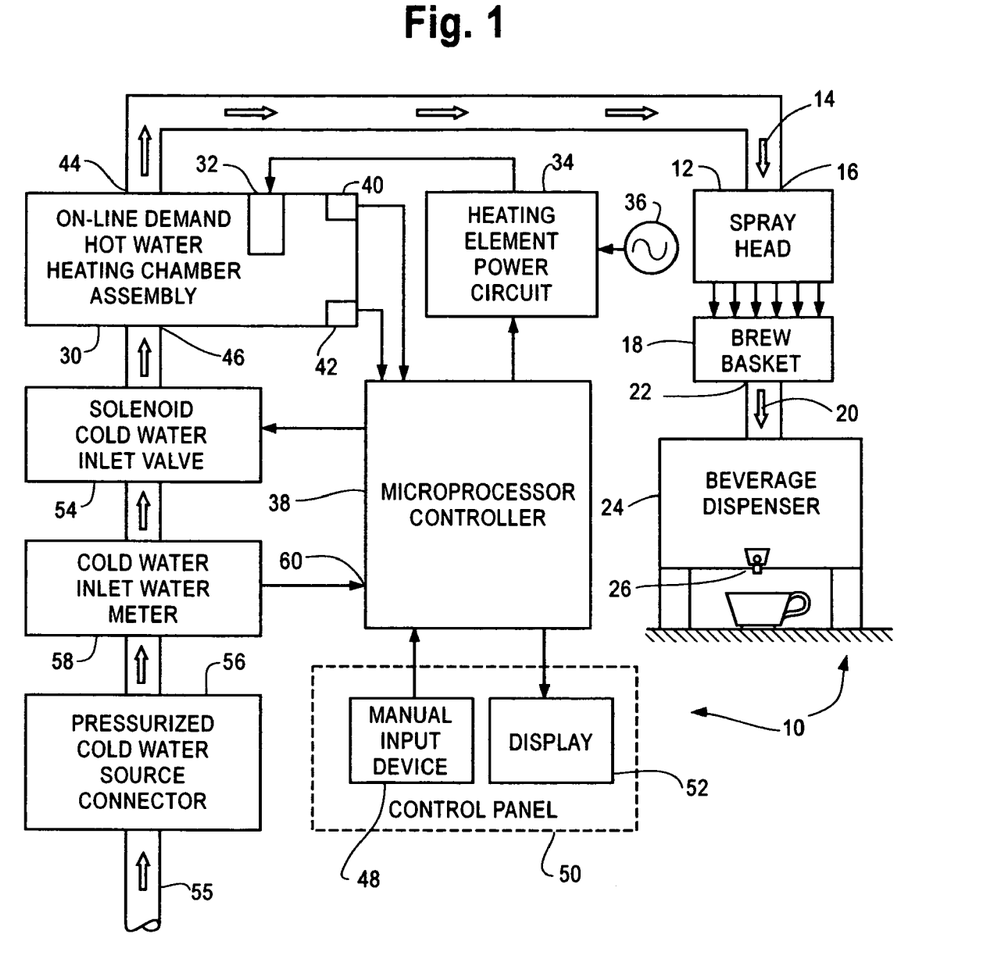
FIG. 1 is a functional block diagram of an embodiment of a multi-beverage, on-demand brew temperature variable brewer illustrating the present invention.

Referring now to FIG. 1, a preferred embodiment of the multi-brewer 10 of the present invention is seen to include a conventional spray head 12 that receives hot water, indicated by arrows 14, within a water input pipe 16, and sprays otherwise distributes the hot water through an open top of a brew basket 18. Contained within the brew basket is a container shaped wire filter basket (not shown) supporting a paper filter which, in turn, supports a layer of beverage ingredient, such a ground coffee beans, tea leaves, ground tea leaves, cocoa, etc. As the hot water percolates though the layer of beverage ingredient within the brew basket 18, beverage components dissolve and mix with the hot water to make the freshly brewed beverage. The freshly brewed hot beverage, indicated by arrow 20, such as freshly brewed coffee, passes through an outlet opening 22 in the bottom of the brew basket 18 and into an insulated beverage dispenser 24. The beverage dispenser 24 is portable, and after it receives a full complement of beverage from a complete brew cycle, it is removed from beneath the brew basket 18 and moved to a serving location. The beverage dispenser 24 has a faucet 26 for dispensing the beverage into a serving cup 28, or another smaller serving dispenser, such as a carafe (not shown). If the dispenser is an airpot type of dispenser, the faucet 26 is located at the top of the dispenser and a pump actuator is provided to pressurize the interior to expel the beverage from the faucet 26.

After the beverage dispenser 24 is removed from beneath the brew basket 18, the multi-brewer 10 is prepared to brew another batch of beverage 20. In a commercial establishment, such as a coffee shop or restaurant, it is sometimes necessary to perform successive brew cycles as quickly as possible. In such case, the brew basket 18 is removed and replaced with another pre-prepared brew basket previously loaded with a fresh filter paper and fresh dry ingredient. Once this brew basket 18 is replaced another brew cycle may immediately commence.

In the case of the brewer 10 being an iced tea brewer or an iced coffee brewer, instead of a hot beverage brewer, cold water is added to the beverage dispenser along with a hot beverage extract which is brewed in the brew basket 18 the same as the regular hot beverage except less brew water may be used and the beverage ingredient may be allowed to seep longer. Such an ice tea brewer is shown and described in U.S.

Pat. No. 6,571,685 issued Jun. 3, 2003 for "Oxygenating Tea Make and Method, which is hereby incorporated by reference. In such case, however, the beverage extract is greatly concentrated so that its flavor characteristics will be present proportionately in the finally cold beverage that is made when the beverage extract is mixed with the cold water. While the beverage brewer 10 is not shown with a cold water mixing chamber or a cold water delivery system for the mixing chamber, it should be appreciated that the multi-brewer 10 may be of either type and the invention may be successfully employed with either type of brewer.

Also, the invention may be employed with any type of brew cycle. The brew cycle includes a first dispense period during which hot water is being added to the brew basket followed by a drain, or drip, time period during which the last of the water added to the brew basket is allowed to seep through the ingredient layer and drain out of the brew basket 18 into the dispenser. During the dispense period, the hot water may be passed to the brew basket 18 continuously, or it may be passed intermittently, as shown and described in U.S. Pat. No. 6,148, 717 issued Nov. 21, 2000 for "Beverage Maker with Intermittent Beverage Liquid Dispenser and Apparatus and method for Uniform Contact of Brew Ingredient with Brew", which is hereby incorporated by reference. Also, the invention may be employed with a brewer in which the dispense rate may be selectively varied, such as shown in U.S. Pat. No. 6,829,901 issued Dec. 14, 2004 for "Coffee Brewer with Independent Control of Dispense Period and Batch Quantity Method" which is hereby incorporated by reference.

Generally, the invention may be employed in any type of freshly brewed beverage brewer in which hot water is added to an ingredient to brew the desired beverage and with which it is desired to quickly brew in succession different beverages that require different brew water temperatures for optimum extraction of the desired flavor qualities of the beverage ingredient in question.

In the present invention, the shortcomings of the single temperature, mono-beverage brewers are overcome with two main features. First, the large hot water chamber is replaced with an on-demand hot water heating chamber assembly 30 that has a chamber with a maximum volume capacity that is substantially less than several times the volume of a single batch of beverage that can be made during a single brew cycle and preferably has a volume that is less than the volume of a single batch. The on-demand hot water heating chamber assembly has an internal electrical heating element 32 that is selectively energized by a suitable heating element power circuit 34, such as a high power triac, or other like semiconductor based high power switching circuit or a solenoid controlled switch, used to connect AC line power from a public utility on site (not shown). The heating element power circuit 34 is controlled by a microprocessor controller 38. The controller 38 is responsive to a pair of thermal couples 40 and 42 located respectively adjacent an outlet 44 and an inlet 46 of the on-demand hot water heating chamber assembly 30 and to a manual input device 48 to control the temperature of the water within the chamber 30.

The manual input device 48 is part of a control panel 50 that preferably also include an electronic or other type of display 52. The manual input device 48 basically provides an interface that enables a user to select one of at least two different beverages, or two different temperatures, for the start of a new brew cycle. When a new brew cycle is started, generally by actuating a start switch (not shown) of the control panel, the microprocessor controller 38 actuates a solenoid cold water inlet valve 54 to open. This allows pressurized cold water from a public water utility or other general source, 55 connected a cold water inlet water meter 58 to pass through the meter 58 and cold water source connector 56 to the on-demand hot water heating chamber assembly 30.

The inlet water meter 58 measures the quantity of cold water passing through the solenoid cold water inlet valve 54 and into the hot water heating chamber assembly 30. Upon start up of the brewer, the on-demand hot water heating chamber assembly is filled to capacity and heated to a preselected minimum temperature, preferably the lowest of the preselected optimum temperatures of the beverages that may be selected. Accordingly, when water flows into the inlet 46, the preheated hot water in the heating chamber assembly 30 is forced out of the heating chamber outlet 44 and to the spray head 12. The amount of hot water that is passed to the spray head 12 is the same as the amount of cold water that is added at the inlet 46 of the heating chamber assembly 30. When no more water is added through the inlet 46, no more water leaves the outlet 44.

If the temperature of the hot water within the hot water heating chamber assembly 30, as sensed by the electronic temperature sensors 40 and 42, is at the preselected temperature of a selected beverage, then the microprocessor controller 38 opens the cold water inlet valve to start a brew cycle. The brew cycle proceeds in accordance with a predetermined, program for the selected beverage that determines for each beverage selected, in addition to brew water temperature, other brew parameters. Such other brew parameters may include the batch size, the duration of the dispense period and the drip period, the number and size of dispense pulses (if intermittent dispense operation is employed), the flow rated during the dispense period (if flow rate is controlled)se water is passed to the spray head 12 during the dispense period of the brew cycle, or batch size, and the percentage of bypass water that passed through the brew basket but not through the ingredient.

The actual total dispense time period for continuous operation and the duration of dispense pulses during intermittent operation are, in fact, determined by the quantities of water that pass through the cold water inlet water meter 58. That is, the dispense time period or pulse is completed when the preselected quantity that was to be dispensed is, in fact, dispensed as indicated by the inlet water meter 58. The microprocessor controller 38 responds to electrical output signals at an input 60 indicating the quantity of cold water that has passed since the start of a brew cycle to determine the timing of any intermittent operation and when the solenoid controlled cold water inlet valve 54 should be closed at the end of the dispense period of the brew cycle. Other parameters, as needed, may be included in the programmed brew cycle profile.

Figure 2:
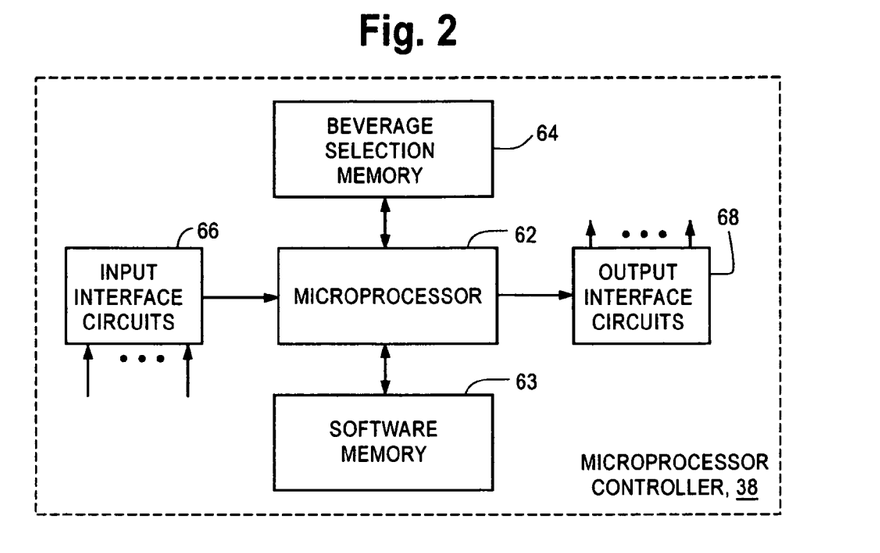
FIG. 2 is a functional block diagram of the microprocessor controller shown as a single functional block in FIG. 1.

Now, turning also to FIG. 2, the microprocessor controller 38, is seen to include a microprocessor 62 that is interfaced with a beverage selection memory 64 in which is stored the various parameters that compose the brew cycle profile, including the brew water temperature for each of a plurality of preselected beverages. Suitable input interface circuits 66 are provided for interfacing the microprocessor with the cold water inlet meter 58, the manual input device 48 and the two temperature sensors 40 and 42. Suitable output interface circuits interface the microprocessor 62 with heating element power circuit 34, the solenoid cold water inlet valve 54 and the display 52. The microprocessor is also interfaced with a software memory 70 in which is stored the computer program for operation and parameter programming of the multi-brewer shown in flow chart form in FIGS. 6 and 7.

Figure 6:
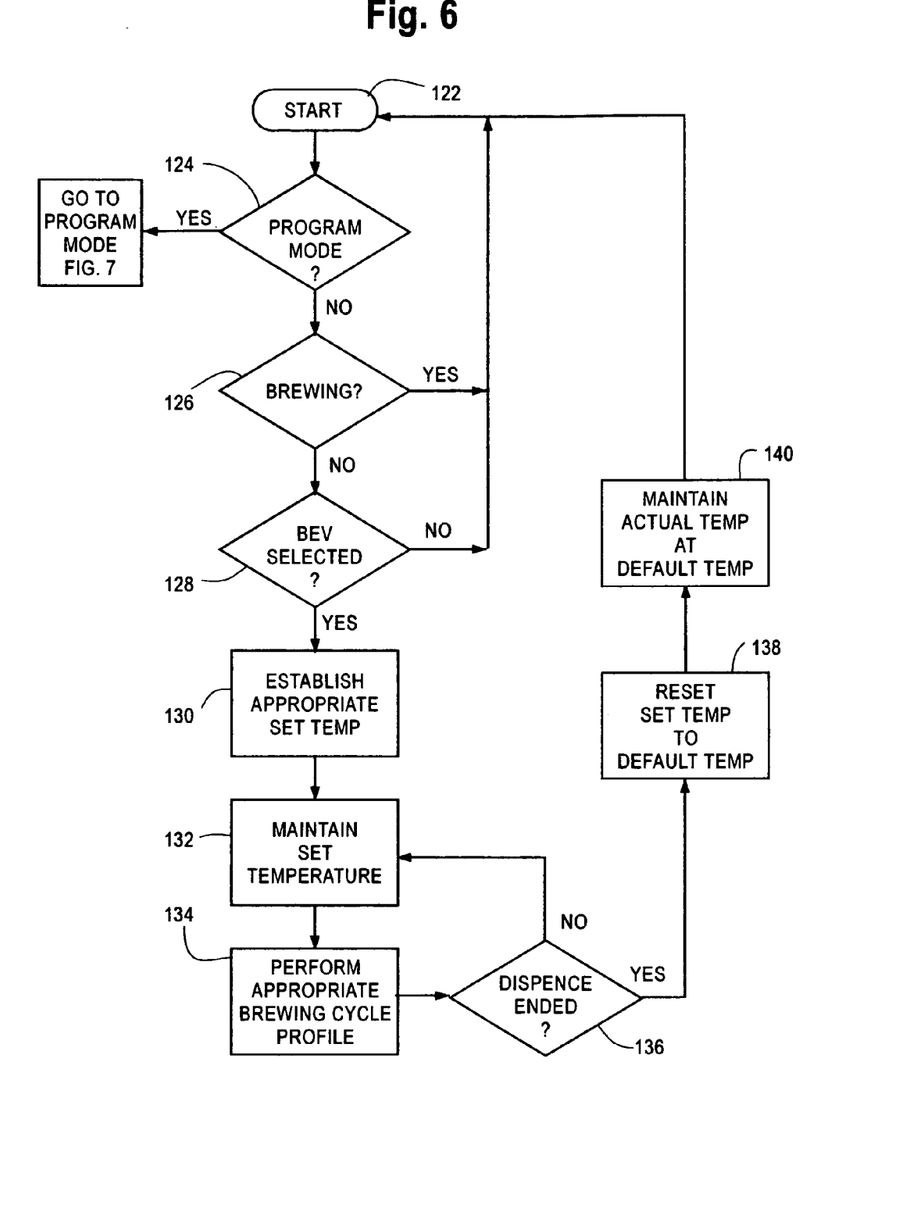
FIG. 6 is a flow chart of software program stored in the software memory of FIG. 2 and which illustrates the normal operation of the brewer of FIG. 1.
Figure 7:
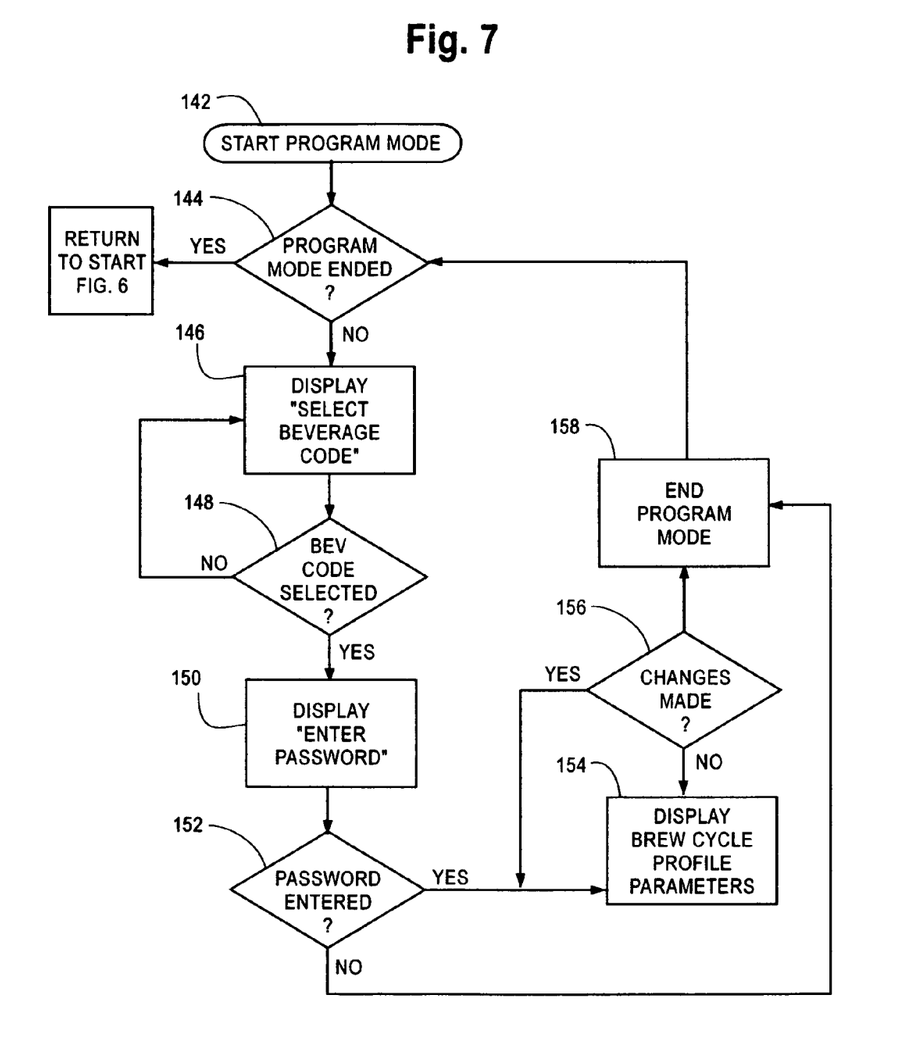
FIG. 7 is a flow chart of the program mode subroutine of FIG. 6.

Stored in the beverage selection memory are all the needed parameters required by the operating software of FIG. 6 to operate the multi-brewer 10. For instance, referring to FIG. 3, for each brew profile code number 1-N, where N may be any natural number, there are at least four different types of parameters stored. One parameter is the name of beverage ingredient, or beverage, such as black tea, green tea, coffee house blend one, Kona coffee, etc. Some of these beverage codes, such as the one for green tea, and their associated parameters may be prestored by the manufacturer and password protected to prevent change by the user. Other codes, such as the one for house blend one, may be profiles that the user may program or have programmed on site. These names may be shown on the display during programming or during operational use.

Figure 3:
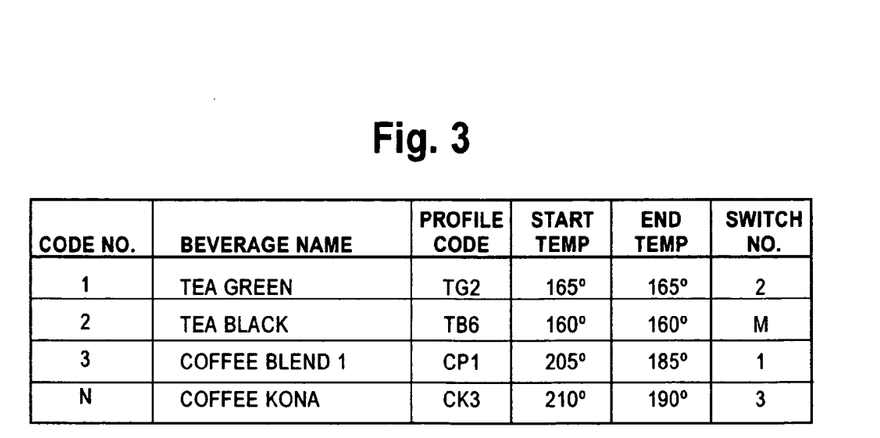
FIG. 3 is a chart of different types of beverage together with the brew cycle profile codes and brew temperatures that may be selectively chosen for different beverages that may be brewed by the brewer of FIG. 1 and which are stored in the beverage selection memory functional block of FIG. 2.

The next parameter is the brew cycle profile code, such as TG2, indicating a second one of two possible preselected green tea profiles, that is stored in the beverage selection memory 64 and associated with the beverage code number. The brew cycle profile includes the total quantity to be dispensed and therefore the batch size. One profile may specify a batch size of one gallon while another profile may designate a one-half gallon batch size. One profile may specify intermittent dispensing with dispense pulses of one duration while another specifies another duration. Another may specify continuous dispensing.

The third parameter is the start brew temperature which is the minimum temperature at which the hot water must be to enable the start of a particular brew cycle. This temperature is selected to be the optimum brew water temperature for the beverage ingredient alone or the optimum temperature for the particular ingredient in question in light of the associated profile. Such optimum temperatures are determined empirically often by the providers of the beverage who try different temperatures and test them on potential consumers with regard to taste, aroma, texture, and other like qualities.

The fourth parameter is the desired end temperature should the profile call for the temperature to be reduced before the end the dispense period of the brew cycle. Generally, the end temperature will be a default temperature equal to the lowest preselected optimum temperature of the various beverages that may be selected. However, a different end temperature lower than the start brew temperature may be selected, such as a temperature intermediate between the start temperature and the lowest default temperature.

Figure 4:
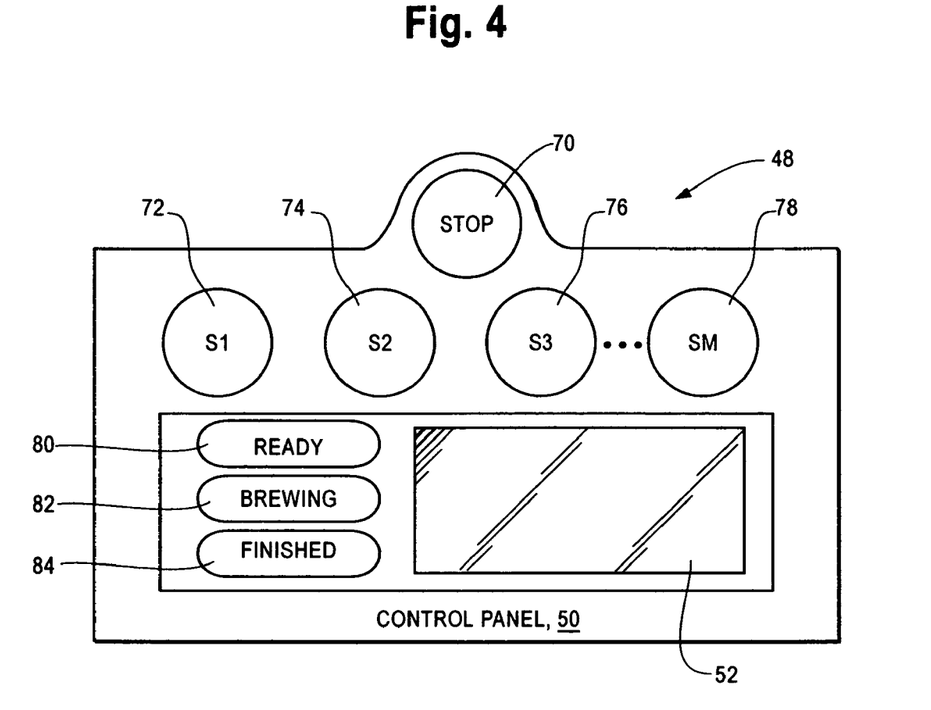
FIG. 4 is a schematic illustration of a control panel that may be used in conjunction with the brewer of FIG. 1.

If multiple start switches are used for different beverage selections, instead of a single start switch used in combination with a separate beverage selector, then the fifth parameter is the identification of the one of the plurality of start switches that is associated with the beverage code number. In such case, for instance, there may be four different start brew switches, each of which may be assigned to any one of ten, twenty or more beverage code numbers, such as illustrated in FIG. 4. Alternatively, there may be only one start switch used sequentially in combination with a plurality of beverage selection switches or in combination with a single multi-throw switch with which a plurality of different beverage code numbers may be selected.

Thus, as seen in FIG. 3, beverage code number one is assigned to a green tea beverage, that has a profile code TG2, a start temperature of 165-degrees, an end temperature of 165-degrees and is assigned to switch number two. With this particular operations programming, when start switch number two is actuated, the controller 38 controls the heating element 32 and the solenoid cold water inlet valve 54 to perform the designated brew cycle profile which includes the total amount of brew water, the incremental amounts of brew water if the dispense period is intermittent, the time period between pulses of delivery of dispensed brew water, the duration of the drip period following the end of the dispense period and the percentage of bypass water. Also, preferably a time out period is also specified for the dispense period at the end of which the solenoid controlled valve 54 is closed regardless of the inputs being provided by the cold water inlet water meter.

Referring to FIG. 4, the control panel 50 of FIG. 1 may include an emergency stop switch 70, a plurality of switches labeled S1, S2, S3 through SM, where M is any natural number larger than three. The switches are respectively numbered, 74, 76, 76 and 77. The control panel 50 also includes back lit status indicator lights 80, 82 and 84. Switch 80 indicates the brewer is ready to start a brew cycle. This ready condition means that the heating chamber assembly is filled with water, that the water is at the preselected minimum temperature and that the brewer is otherwise ready to start a brew. Switch 82 indicates that the brewer 10 is in the middle of a brew cycle including the drip period, and switch 84 indicates when a brew cycle is finished. The display 52 is preferably an LCD alphanumeric display that is used to provide programming information to the programmer during programming.

If one of the switches 72, 74, 76 or 78 is actuated when the brewer is ready to brew, a brew cycle is performed in accordance with the brew parameters associated with the brew cycle code number assigned to that particular switch. Alternatively, only two of the switches are provided: one for use in conjunction with the display of a menu of selectable brew code numbers to navigate through menu and then select the desired brew cycle code number for the next brew cycle and a second switch to start the brew cycle that has been selected with the first switch and which is being shown on the display 52

Figure 5:
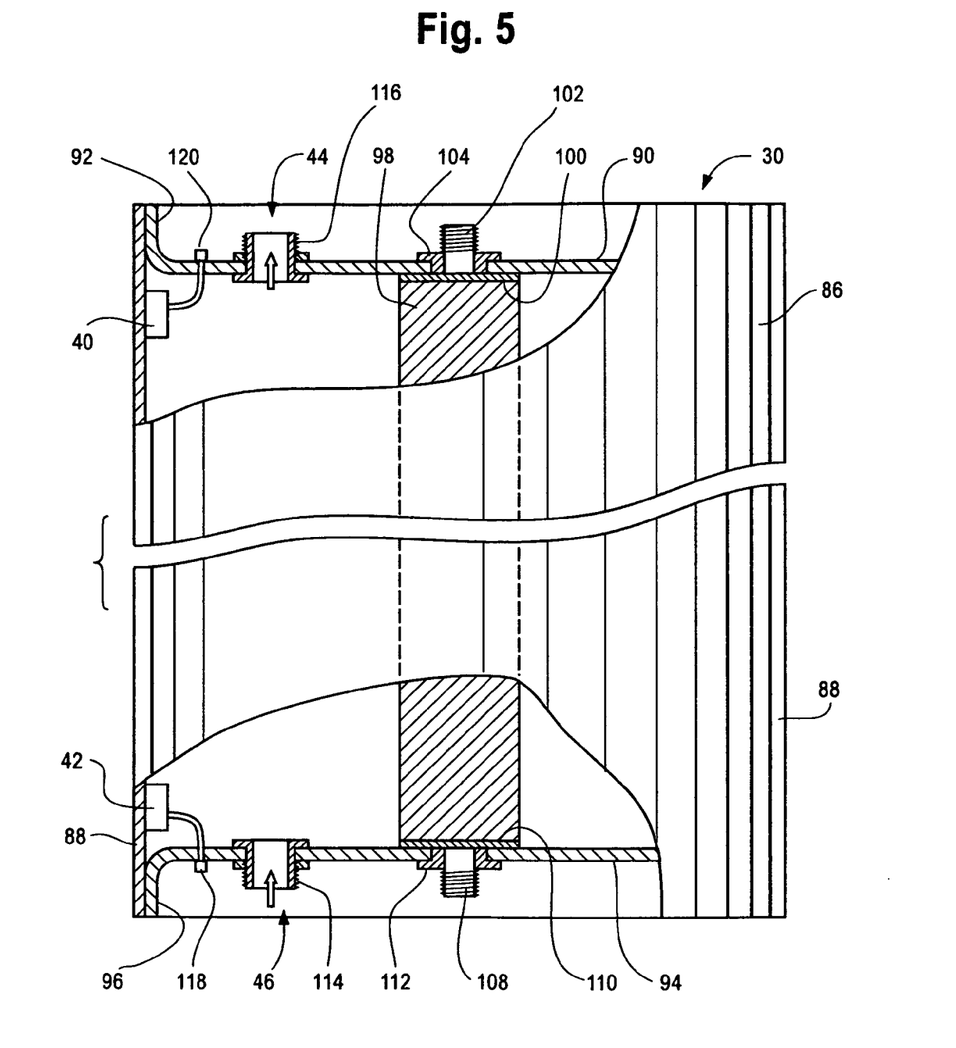
FIG. 5 is a schematic illustration, partially in cross section, showing an on-demand hot water heating chamber shown as a single functional block in FIG. 1.

Referring now to FIG. 5, while other forms of on-demand heating chamber assemblies may be used, preferably the on-demand hot water heating chamber assembly 30 has the configuration shown in FIG. 5. As seen, the assembly 50 has a hollow, elongate chamber 86, with a cylindrical side wall 88, a cup-shaped, stainless steel outlet closure 90 welded to an outlet end 92 around its circumference and an inlet closure 94 welded around its circumference to the interior of the cylindrical wall 88 at inlet end 96.

Supported along the central axis of the cylinder is an electric heating element, or heating rod 98, held between the interior surfaces of the inlet closure 94 and the outlet closure 90. An insulator cap 100 electrically isolates the electrical heating element 98 from the outlet closure 90. An externally threaded electrical connector 102 extends from the outlet end of the heating element 98 and through a mating connector mounting hole in the outlet closure that is surrounded by an electrically isolating insulator grommet 104 that also seals the connector within the connector mounting hole. Similarly, an insulator cap 106 electrically isolates the electrical heating element 98 from the inlet closure 94. An externally threaded electrical connector 108 extends from the inlet end of the heating element 98 and through a mating connector mounting hole in the inlet closure 94. The threaded electrical connector 108 is surrounded by an electrically isolating insulator grommet 112 that also seals the connector 108 within the connector mounting hole.

Water flows into the heating chamber 86 through a threaded hose connector 114 welded to the inlet closure 94 and flows out of the chamber 86 though a threaded outlet hose connector 116. Both hose connectors 114 and 116 surround associated flow openings and are welded to their respective closures.

The inlet thermocouple 42 is mounted to the interior of the heating chamber adjacent the inlet 46 and has a pair of electrical leads connected to a threaded electrical connector 118 mounted within a suitable mounting hole that passes through the inlet closure 94 for releasable connection with the controller. Similarly, the outlet thermocouple 40 is mounted to the interior of the heating chamber 86 adjacent the outlet 44. It also has a pair of electrical leads connected to a threaded electrical connector 120 that is mounted in a suitable mounting hole in the inlet closure 94 for releasable connection to the controller 38. Both electrical connectors 118 and 120 are electrically isolated from the stainless steal chamber 86.

While other heating elements may be used, the heating rod 98 is cylindrical with a diameter of approximately one-half inch and a maximum power rating of approximately 2.2 kilowatts. Generally, generation of at least 75-watts per square inch of surface area of the heating element has been found adequate for the on-demand temperature changes noted herein. Such a heating element may be used with a heating chamber 86 having a diameter significantly larger and a length that is approximately the same as that of the heating rod 98. Unlike the slow heating high thermal inertia hot water chambers of the known beverage brewers that may have volumes of several or more gallons for brewing batches of beverage of approximately one-half gallon, the volume of the chamber is preferably less than the one-half gallon batch size, perhaps only one or two pints. If a larger batch size is contemplated, then the chamber may be increased proportionately.

The microprocessor controller 38 preferably operates in accordance with the flow chart of FIG. 6. After start 122, in step 124 a decision is made as to whether the controller 38 has been placed into the program mode for purposes of entering the parameters discussed above with respect to FIG. 3. Entry in this program mode may be by simultaneously actuating a selected pair of the start switches 72, 74, 76 and then using these three switches to navigate through the program and to make selection of desired parameter settings from so-called drop down menus. If the controller is currently in the program mode, then the controller functions in accordance with program mode subroutine described with reference to FIG. 7.

If not, then in step 126, it is determined whether a brew cycle is in process. If yes, then the program recycles back to start 122 until the brew cycle including the drip period has ended. Once the brew cycle is ended, the program moves to step 128, where it is determined whether a beverage has been selected by actuation of one of the brew start switches 72, 74, 76 and 78 has been actuated to indicate the start of a brew cycle of a preselected beverage in accordance with the associated brew cycle profile that was established for that beverage selection during the program subroutine of FIG. 7.

If the start of a new brew cycle has been initiated, then in step 130, the appropriate brew temperature that was set for the beginning of the brew cycle is set. This is performed by the controller 38 first comparing the temperatures sensed by the two thermocouples 40 and 42 to determine whether the heating chamber assembly 30 is filled with water. If the two temperatures are approximately the same, then it is assumed that they are both in contact with water. If the temperatures are significantly different, then this suggests that only one of the thermocouples is immersed in the water, and the solenoid controlled inlet valve is actuated to add until the temperatures become approximately the same. Generally, this only needs to be done once at the beginning of initial start-up. After start-up, the hot water chamber is filled and generally is kept at the lowest base temperature of any of the selectable beverages, such as 165-degrees F. for green tea, which is referred to as the default temperature.

If the set beverage temperature is the same as the default temperature, then the appropriate set temperature is already established and no further action is needed except to maintain that temperature during the brew cycle. If the set temperature is higher than the default temperature, then the controller 38 energizes the heating element 98 through control of the heating element power circuit 34 until the actual temperature, as sensed by the thermocouples 40 and 42, equals the set temperature that has been preselected for the beverage in question. For instance, if coffee blend one, FIG. 3, is being brewed, the heating element is energized until the actual temperature reaches 205-degrees F.

After the set temperature has been achieved, in step 132, the preselected set temperature is maintained by monitoring the thermocouples and energizing the heating element as needed, and in step 134, the brew cycle is commenced and performed with the appropriated brew cycle profile. This brew cycle profile will include the volume, the percentage of bypass water, the time duration between pulses if there is a pulsed delivery profile, the duration of the drip period, the starting set temperature, the quantity of water that is passed when the set temperature changes from the start temperature and becomes the end temperature, if the end temperature is different from the start temperature, and the magnitude of the end temperature if it is different from the start temperature. The profile may also include the percentage of bypass water. The end temperature may be set before the end of the dispense period and may be higher than the default temperature but is generally lower than the start temperature.

In step 136, if the dispense period of the brew cycle is ended and the set temperature has not already been reset to the end temperature, then in step 138, the set temperature is reset to a default temperature that is preferably selected to be the lowest start temperature of the all the selectable beverages. If the default temperature is not the same as the end temperature, then the actual temperature is lowered from the end temperature to the default temperature. In step 140, the default temperature is maintained and the program returns to start 122 to await the start of the next brew cycle.

Referring now to FIG. 6, if the brewer 10 has been caused to enter the program mode, such as in response to continuous actuation of a selected one of the start switches 51, 52, 53 and 78 of FIG. 4 to be programmed, then in step 142 the program mode is entered and brewing operation in response to actuation of the switches is disabled. Next, in step 144, it is determined whether the program mode has ended. If not, then in step 146, the microprocessor controller 38 of FIG. 2, functions to cause the display 52 of FIG. 4 to show the message, "SELECT BEVERAGE CODE". The operator may then choose a code for any one of the selected switches again by manually manipulating one or more of the switches of the control panel of FIG. 4 to navigate through and select choices in drop-down menus or the like.

Each beverage code number has associated with it a brew cycle profile that includes the temperature of the water that must be reached before a brew cycle can begin and which is maintained until the end portion of the brew cycle, the end temperature to which the temperature of the brew water is changed during the end portion of the brew cycle, and the brew cycle profile that indicates the duration of the brew, the quantity of beverage to be brewed, the percentage of bypass, whether the delivery of brew water is pulsed or continuous and, if pulsed, the duration of the pulses and pauses between pulses, and the duration of the brew cycle. Normally, the operator is only allowed to choose one of the pre-established codes and may not alter the parameters associated with the code. However, field technicians and others may be permitted to change the parameters associated with the selected code.

After a beverage code has been selected in step 148, if step 150, the phrase "ENTER PASSWORD" is displayed. Next, in step 152, if a correct password is entered within a preselected time period, then the program moves to step 154 in which the selected brew cycle parameters are displayed. Changes then may be made to the parameters, and as long as changes are made as detected in step 156, the parameters continue to be displayed and changes continue to be permitted. If no changes are made for a preselected time-out period, then in step 156, the program is moved to step 158 to end the program mode. In step 144, when it is determined that the program mode has ended, the program is returned to start 122 in FIG. 6, and normal brewing operation may commence with the new code change, parameter change or both. If desired, another one of the brew start switches may then be selected for reassignment to a new beverage code.

While a specific embodiment has been described above in detail, it should be appreciated that the invention is not necessarily limited to any of such details and variations may be made without departing from the scope of the invention as defined by the appended claims. In the above exemplary brewer, only two temperatures are designated for each beverage, it should be appreciated that advantage may be obtained by specifying an intermediate temperature to which the brew water is brought in addition to specifying only a start temperature and an end temperature. Also, more that four start switches may be provided if desired. The controller may also cause the display to show the name of the beverage and code number when the associated start switch is actuated to start a new brew cycle or other electronic displays associated with the start switches may be automatically displayed to indicate the beverage assigned to each of the start switches.

The invention claimed is:

1. In a beverage brewer having a brew basket assembly for holding ingredient to be brewed and a dispense head for passing water onto a layer of ingredient supported within the brew basket assembly during a dispense period of a brew cycle, the improvement being a temperature selectable dispense system, comprising:
    means for preselecting at least one temperature;
    an on-demand hot water heating chamber assembly having
        a hollow, hot water chamber for holding water to be heated,
        an inlet to the hot water chamber connectable with a source of unheated water,
        an outlet of the chamber connected with the dispense head,
        means for heating water within the chamber at a rate sufficient to maintain the temperature of water passing out of the outlet at the preselected temperature while unheated water at a temperature less than the preselected temperature enters the inlet during the dispense period, and
        means for sensing the temperature of the water within the chamber;
    a microprocessor controller responsive to the temperature selecting means and to the temperature sensing means to control the heating means as needed to maintain water being passed from the outlet at the preselected temperature during at least a part of the dispense period.

2. The beverage brewer of claim 1 in which
    during each dispense period, a preselected quantity of water is passed to the brew basket to brew a preselected batch volume of freshly brewed beverage, and
    the volume of the hollow chamber is significantly less than the preselected batch volume.

3. The beverage brewer of claim 2 in which the ratio of the hot water chamber volume to the batch volume is approximately 0.6.

4. The beverage brewer of claim 3 in which the batch volume is approximately one of (1) one half gallon, (b) one gallon and (c) one and one half gallon.

5. The beverage brewer of claim 4 in which the heating means is an electrical heating element with a power rating of approximately 2.4 kilowatts.

6. The beverage brewer of claim 4 in which the heating means includes an electrical heating element contained within the hollow hot water chamber that generates approximately seventy-five watts of heating power per square inch of surface area of the heating element.

7. The beverage brewer of claim 1 in which the means for heating includes an electrical heating element contained within the hollow hot water chamber.

8. The beverage brewer of claim 1 in which
    the hollow body of the hot water chamber has a central axis of symmetry, and
    the heating means is an elongate electrical heating element extending along the central axis of symmetry.

9. The beverage brewer of claim 1 in which
    the hollow chamber has an inlet end that is sealed closed except for the inlet and an outlet end spaced oppositely of the inlet end that is sealed closed except for the outlet, and
    the heating means is an electrical heating element with a pair of electrical connectors that are respectively mounted to both the inlet end and the outlet end and accessible for electrical contact from without the hollow body.

10. The beverage brewer of claim 1 in which
    the temperature sensing means includes at least one temperature sensor,
    means for mounting the at least one temperature sensor adjacent the outlet end and within the hollow hot water chamber, and
    an electrical contact for making electrical contact with the one temperature sensor on an exterior surface of the chamber.

11. The beverage brewer of claim 10 in which
    the temperature sensing means includes another temperature sensor,
    means for mounting the other temperature sensor substantially spaced from the one temperature sensor, and
    another electrical contact for making electrical contact with other temperature sensor at an exterior surface of the chamber.

12. The beverage brewer of claim 1 in which
    the selecting means includes means for selecting another temperature at which the temperature is to be maintained at the end of the dispense period, and
    the microprocessor controller is responsive to the other temperature to control the heating means as needed to maintain water passing from the outlet of the chamber at the end of the dispense period.

13. The beverage brewer of claim 12 in which the one temperature is higher than the other temperature.

14. The beverage brewer of claim 13 in which the two different types of beverages are selected from black tea, green tea, and different type of coffee and the controller causes the on-demand selecting means to heat the dispense water to approximately 165 degrees Fahrenheit degrees when green tea has been selected, to heat the dispense water to approximately 210 Fahrenheit degrees when black tea has been selected, and to heat the dispense water to 205 Fahrenheit degrees when one type of coffee is selected and to heat the dispense water to a different temperature when another type of coffee is selected.

15. The beverage brewer of claim 1 including an inlet connection assembly for connecting the inlet to a source of pressurized water including
   a flow meter for measuring the quantity of water being passed from the water source and the inlet, and
   a control valve connected in series relationship between the water source and the inlet, entry of water through the inlet forcing water out of the outlet and into the brew basket.

16. The beverage brewer of claim 1 in which the hot water chamber has enclosing side walls extending between the inlet and the outlet and the heating means includes a heating element spaced from the side walls to allow water within the hot water chamber to surround the heating element.

17. The beverage brewer of claim 1 in which the microprocessor controller is programmed to normally maintaining the water within the hot water chamber at a lowest one of the at least two different temperatures prior to start of a brew cycle.

18. The beverage brewer of claim 1 in which the microprocessor controller is programmed to automatically return the temperature of the water within the hot water chamber to a lowest one of the at least two temperatures by at least no later than the completion of a brew cycle in which the water had been maintained at a higher one of the at least two temperatures.

19. The beverage brewer of claim 18 in which the microprocessor controller is programmed to automatically return the temperature of the water within the hot water chamber to a lowest one of the of the at least two temperatures by at least no later than the end of a dispense period of a brew cycle in which the water had been maintained at a higher one of the at least two temperatures.

20. A beverage brewer for brewing different types of beverages, comprising:
   a brew basket assembly for selectively holding different beverage ingredients;
   a manual selection switch for selectively starting different brew cycles associated with different beverage ingredients;
   a dispense system for dispensing hot water onto the ingredient within the brew basket assembly at different selectable temperatures; and
   a controller programmed to control the dispense system to dispense the hot water during a brew cycle at the different selectable temperatures that are optimal temperatures associated with the different beverage ingredients in response to the manual selection switch.

21. A beverage brewer for brewing different types of beverages, comprising:
   a brew basket assembly for selectively holding different beverage ingredients;
   a manual selection switch for selectively starting different brew cycles associated with different beverage ingredients;
   a dispense system for dispensing hot water onto the ingredient within the brew basket assembly
   a controller programmed to control the dispense system to dispense the hot water during a brew cycle at different optimal temperatures associated with the different beverage ingredients in response to the manual selection switch, the controller automatically lowersing the temperature to the lowest temperature associated with one of the different ingredients at least by the end of a prior brew cycle in which a beverage ingredient having an associated optimal temperature that is higher than the lowest temperature had been selected.

22. A beverage brewer for brewing different types of beverages, comprising:
   a brew basket assembly for selectively holding different beverage ingredients;
   a manual selection switch for selectively starting different brew cycles associated with different beverage ingredients;
   a dispense system for dispensing hot water onto the ingredient within the brew basket assembly
   a controller programmed to control the dispense system to dispense the hot water during a brew cycle at different optimal temperatures associated with the different beverage ingredients in response to the manual selection switch, the controller automatically lowering the temperature to the lowest temperature associated with one of the different ingredients at least by the end of a dispense period of prior brew cycle in which a beverage ingredient having an associated optimal temperature that is higher than the lowest temperature had been selected.

23. The beverage brewer of claim 20 including
   a heating chamber through which the hot water is passed to the brew basket assembly, and in which
   the amount of water that is passed to the brew basket assembly during a dispense period of a brew cycle is substantially more than the maximum quantity that can be held by the heating chamber.

* * * * *